May 12, 1931.  E. J. BRING  1,805,071
RAILWAY BOOSTER
Filed Oct. 16, 1925  3 Sheets-Sheet 2
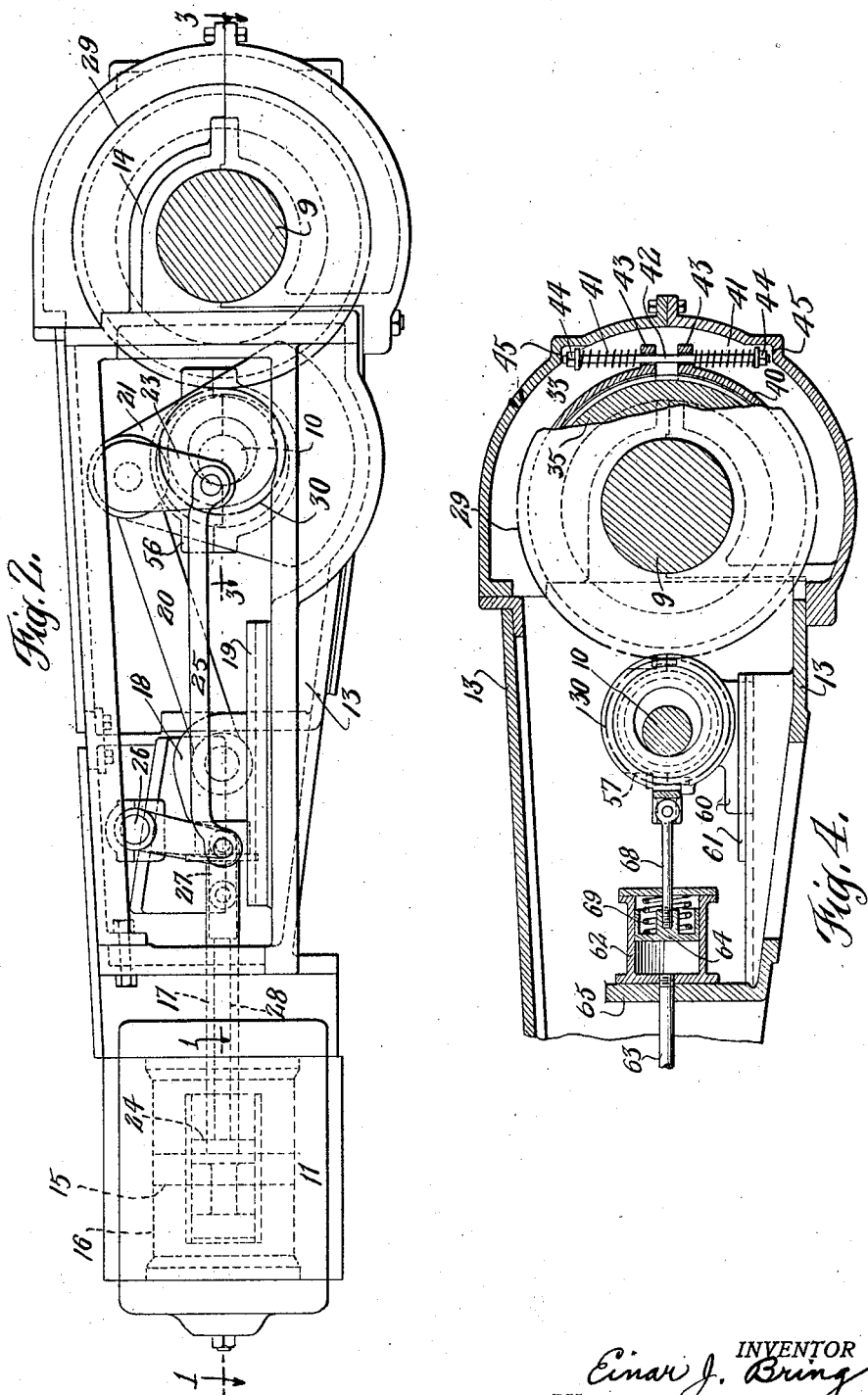
INVENTOR
Einar J. Bring
BY Synnestvedt & Lechner
ATTORNEYS

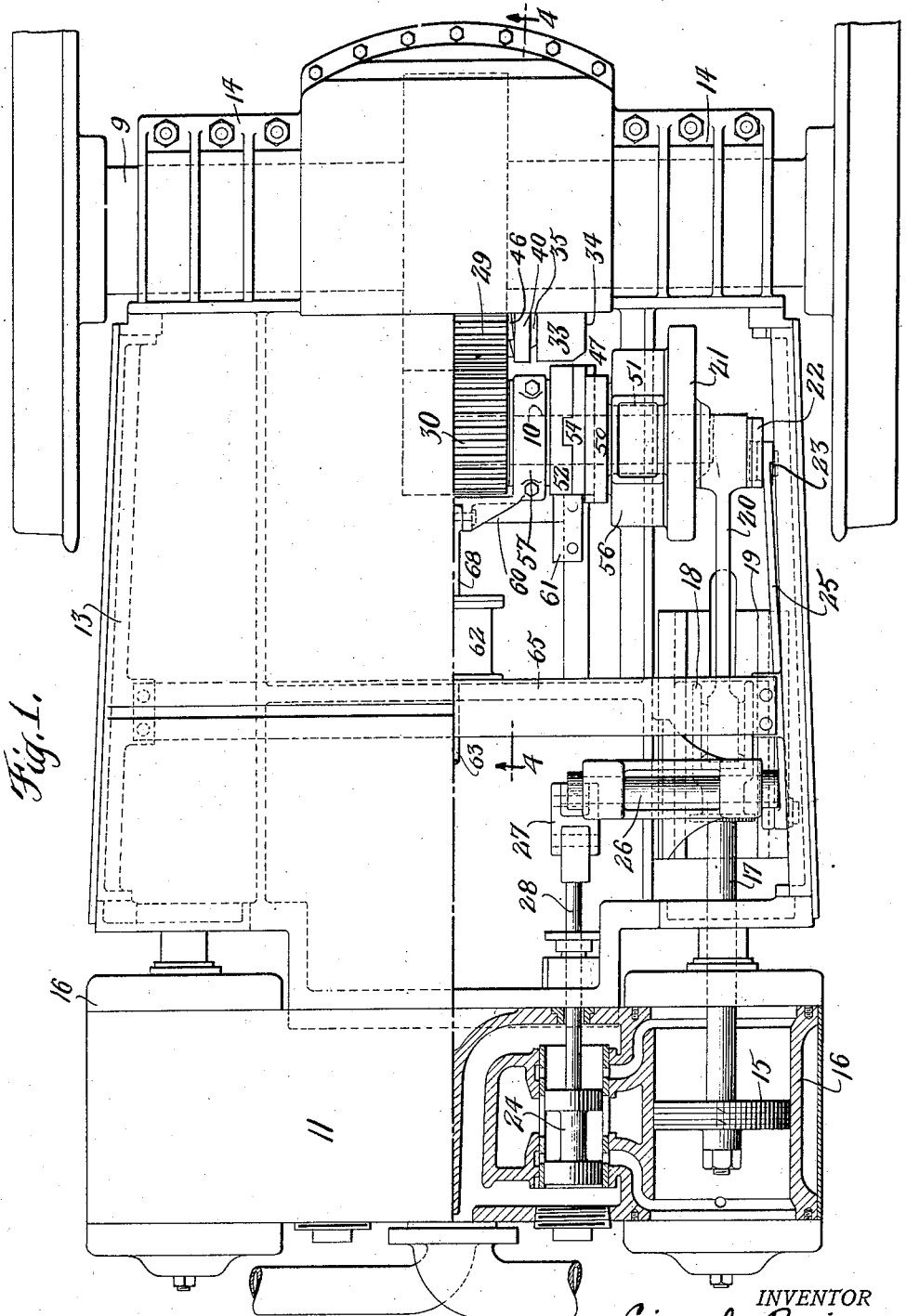

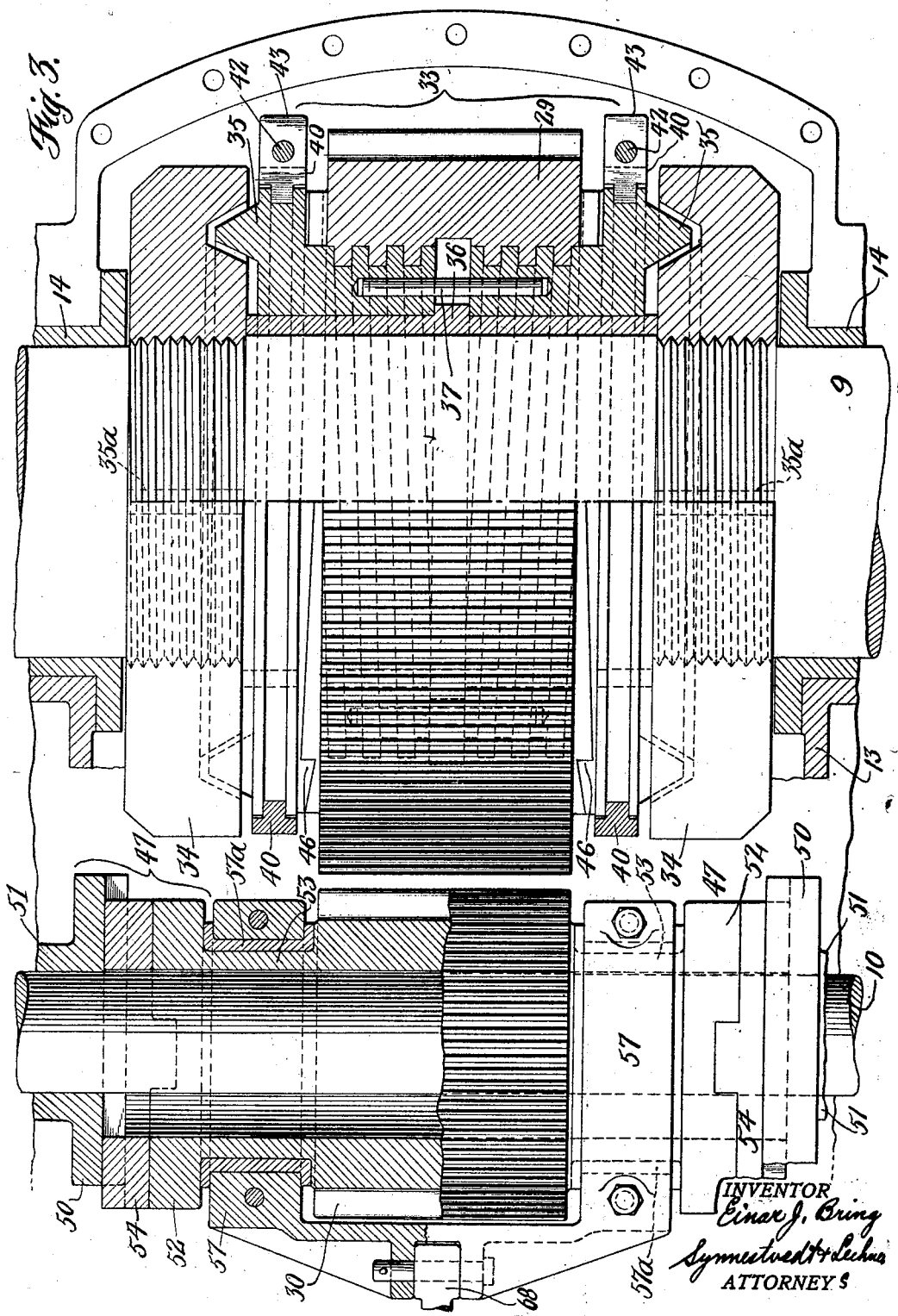

Patented May 12, 1931

1,805,071

UNITED STATES PATENT OFFICE

EINAR JOHAN BRING, OF FRANKLIN, PENNSYLVANIA, ASSIGNOR TO FRANKLIN RAILWAY SUPPLY COMPANY, A CORPORATION OF DELAWARE

RAILWAY BOOSTER

Application filed October 16, 1925. Serial No. 62,724.

My invention relates to railway boosters, such as are used on railway vehicles to assist in their propulsion. For this purpose, the booster may be applied to an axle of a locomotive trailer truck, or to any other suitable axle of the locomotive or its tender, or of some other vehicle or car in a railway train. In general, such a booster serves to increase the tractive power in starting and at slow speeds, by making drivers of wheels which would otherwise merely help to sustain the deadweight. However, the booster is not ordinarily intended to drive the locomotive or the train by itself, or to operate at high speeds, and its control system is, therefore, generally arranged to disconnect it automatically under such conditions. In present practice, the booster drives the axle to which it is applied through a gear train including a gear on the axle, a gear on the booster shaft and an idler gear meshing with these booster and axle gears; and the booster is connected and disconnected by throwing the idler gear into and out of mesh with the axle gear.

I aim to improve and simplify railway boosters, and their control, especially as regards the driving connections between the booster and the axle to which it is applied, and the provisions for bringing the booster into operation to drive the vehicle and vice-versa. I aim to make the driving connections themselves accomplish the disconnection of the booster when speeds at which it should not operate are reached, and to do away with the use of an idler gear such as above described. Such gears are not only expensive and subject to rapid wear, but are liable to cause breakage or re-arrangement such as may put the booster out of commission, and even render the locomotive inoperative.

How one or all of these and other objects and advantages can be realized through my invention will appear from my description hereinafter of a selected and preferred form of embodiment.

In the drawings, Fig. 1 is a plan view of a booster and the associated trailer axle and wheels; and in the lower half of this figure the cover is removed from the casing, and various parts appear in horizontal section as indicated by the line 1—1 in Fig. 2.

Fig. 2 is a side view of the booster, with the side of its casing removed to expose the parts within.

Fig. 3 is a fragmentary plan view illustrating the connections between the booster and the axle which it drives, various parts being in horizontal section as indicated by the line 3—3— in Fig. 2.

Fig. 4 is a fragmentary view, with various parts in vertical section, taken as indicated by the line 4—4 in Fig. 1.

In the drawings, the booster is shown mounted about the axle 9 which it is intended to drive; it may, of course, be additionally supported as usual, or in any suitable manner. The booster comprises a couple of longitudinally disposed cylinders, with a common transverse crank shaft 10 adjacent to and parallelling the axle 9, and with the steam admission and exhaust structure 11 at the other end. The cylinder structure 11 is attached to the booster frame and casing structure 13, which also carries bearings 14, 14 for the axle 9, and supports and encloses the various operating parts. The piston 15 in each booster cylinder 16 is connected by a rod 17 to a crosshead 18 in ways 19 carried by the casing structure 13, and this crosshead 18 is in turn connected by a connecting rod 20 to a crank 21 at the end of the booster crank shaft 10. Each crank 21 carries a return crank eccentric 23 that actuates the corresponding engine valve 24 through a rod 25, a bell crank 26, and a link 27 connecting the bell crank to the valve stem 28. The driving connection between the booster and the axle 9 includes cooperating gears 29 and 30, on the axle 9 and on the booster shaft 10, respectively.

As thus far described, the booster here shown is substantially like boosters already in use.

As here shown, I have provided for disconnecting the booster when speeds at which it should not operate are reached, by making the driving connection between the booster and the axle 9 automatically and intrinsically ineffective when the locomotive speed exceeds that of the booster. This is accomplished by mounting the driving gear 29 loose on the axle 9, with provisions for automatically connecting the gear to the axle, or disconnecting it, according to the conditions of operation, as by means of a friction clutch mechanism (here shown as double or in duplicate) comprehensively indicated at 33 (Figs. 1 and 3). This clutch mechanism 33 comprises opposed grooved clutch members 34, 34 which are threaded and keyed fast to the axle 9 at 35a and correspondingly ridged clutch members 35, 35 arranged between said members 34, 34 and shiftable along the axle 9 into and out of engagement with them. These members 35, 35 are mounted on a bearing sleeve or bushing 36 on the axle 9 between the clutch members 34, 34 and are shifted by the booster-operated driving gear 29. For this purpose, this gear 29 has heavy internal screw threads in its opposite ends, (one right hand and the other left hand) that engage corresponding external threads on the sleeve-like ends of the clutch members 35, 35.

When the booster starts to turn the gear 29, the double clutch device formed by the members 35, 35 is expanded by the double screw action. As shown, the clutch members 35, 35 are caused to move in unison by pins 37 whose ends have a sliding fit in corresponding holes in the clutch members 35, 35. Preferably, resistance additional to that of their own inertia is provided to prevent the clutch members 35, 35 from initially turning with the gear 29, and thus failing to expand properly. As shown, friction bands 40, 40 are engaged in peripheral grooves in the clutch members 35, 35 for this purpose. The friction of each band 40 with its member 35 may be maintained and determined by helical compression springs 41, 41 on the ends of a bolt 42 extending through lugs 43, 43 on the ends of the band. The tension of these springs 41, 41 may be adjusted by means of the nuts 44, 44 on the bolt 42. To keep each friction device 40 from turning without preventing it from shifting laterally with its clutch member 35, it may be suitably engaged with the booster casing 13; as shown, the ends of the bolts 42 are engaged between shoulders 45, 45, on the casing for this purpose. The springs 41, 41, afford a cushion protection against shock, in addition to the protection due to the lightness of the friction between the band 40 and the member 35. Preferably, the friction is slight; merely enough to assure shifting of the clutch member 35 when the gear 29 starts to turn, without imposing a material drag on the rotation of this clutch member 35 in the subsequent operation of the booster.

While the locomotive is starting and being brought to speed, the booster cooperates to drive it; but as the locomotive attains a speed exceeding that of the booster,—so that on further increase in speed, it would have to drive the booster,—the clutches slip and relieve the locomotive of any drag from the booster. This results from throwing out of the clutch 33 by a reversal of the action by which it was thrown in; i. e., the clutch members 35, 35 are rotated by the members 34, 34 (moving with the axle 9) faster than the gear 29 is rotated by the booster, and thus the clutch members 35, 35 are screwed into the gear 29 away from the members 34, 34. As shown, the adjacent sides of the clutch members, 35, 35 and of the gear 29 are provided with saw-tooth stop means 46, 46, to limit retraction of the clutch members and prevent them from jamming and sticking to the gear 29 (by the action of the screw threads) in case the clutch 33 should be suddenly collapsed by very rapid speeding up of the locomotive. Whenever the locomotive speed falls off sufficiently, the clutch 33 will be thrown in again, to enable the booster to assist in driving the locomotive. Thus the mechanism is differentially responsive to the relative speeds of locomotive and booster.

While the arrangement thus far described connects and disconnects the booster automatically according to the relative speed of the booster and locomotive, it does not permit of "idling" the booster to warm it up at starting after a period of inaction. To permit this, I provide for rendering the driving connections ineffective and inoperative under such circumstances, as now to be described.

In the present instance, the axle gear 29 is driven directly by the booster gear 30, without the intervention of another gear such as about mentioned. In order that the booster may be "idled" to warm it up, the booster gear 30 is mounted for lateral shifting relative to the booster shaft 10, into and out of mesh with the gear 29. As shown, this shifting takes place without interrupting the revolution of the booster gear 30, by virtue of an Oldham coupling connection between gear and shaft, here shown double, as at 47, 47 in Fig. 3. Each of these couplings 47, 47 comprises a diametrally grooved disc 50 integrally connected to the corresponding crank 21 by a sleeve 51; disc 52 with diametral groove at right angles to that of the disc 50 at either side of the gear 30, connected to the gear by a sleeve 53; and a floating disc 54, with diametral ridges at right angles to one another engaged in the grooves of the discs 50, 52. Preferably, the arrangement is such that the gear 30 is concentric with the shaft 10 when in mesh with the gear 29, and revolves on an axis eccentric to said shaft 10 when out of mesh with said gear 29. As here shown, the sleeves 51 form the journal portions of the crank shaft 10, being mounted in the bearings 56 carried by the booster frame structure 13, while the sleeves 53 are mounted in bearings 57 and bushings 57a that are shiftable fore and aft to mesh and unmesh the gears 30 and 29.

While the booster shaft 10 need not be continuous from one crank 21 to the other, it is preferably so, in order to hold the cranks definitely and rigidly in alignment, and to allow the parts associated with the booster shaft to be removed as a unit from their bearings 56. Preferably, the cranks 21 and the sleeves 51 are pressed fast on the ends of the shaft 10.

As shown in Figs. 1 and 4, the bearings 57 for the shiftable members of the Oldham coupling 47 are mounted on a carriage 60 that is slidable fore and aft in ways 61 on the bottom of the casing structure 13. This carriage 60 may be shifted by means of a fluid pressure motor comprising a cylinder 62, mounted on the upright member 65 of the casing 13, and connected by a pipe 63 to a source of fluid pressure as will appear below. As shown, the piston 64 in the cylinder 62 is connected to shift the carriage 60 thru the medium of the piston rod 68. The piston 64 is moved to the right to entrain the booster by pressure behind it and is returned to disentrain the booster by a helical compression spring 69. Preferably, the motive fluid for the gear shifting motor 62 should be from the same source (usually the steam boiler of the locomotive) as the motive fluid for the booster engines themselves; for when this is the case, the pressure in the clutch cylinder 62 will always vary in correspondence with that in the booster cylinders and with the consequent tendency of the gear teeth to unclutch. If fluid from an independent source (such as compressed air from the braking system) be used, its pressure may fall off at times when the steam pressure is greatest, and then the reaction between the gear teeth (due to their angle) may unmesh the gears.

I claim:

1. The combination with a railway booster and the axle to be driven thereby, of connecting means between them automatically and intrinsically ineffective when the locomotive speed exceeds that of the booster, said means including a gear on said axle and a cooperating driving gear on the booster shaft, the axis of rotation of said driving gear being shiftable toward and away from said axle.

2. The combination with a railway booster and the axle to be driven thereby, of connecting means between them including a clutch, with means differentially responsive to the relative speeds of locomotive and booster for throwing the clutch, and means for rendering the last mentioned means ineffective when the booster is started, to permit it to idle before coming under load.

3. The combination with a railway booster and the axle to be driven thereby, of connecting means including a clutch member moving with the axle, a shiftable clutch member, a booster-operated driving member cooperating with said shiftable clutch member to throw the latter into and out of engagement with the first mentioned clutch member, according to the relative speeds of locomotive and booster, and means for rendering said driving member inoperative when the booster is started, to permit the booster to idle before coming under load.

4. The combination with a railway booster and the axle to be driven thereby, of connecting means between them including a clutch, comprising laterally shiftable members differentially responsive to the relative speeds of locomotive and booster for throwing the clutch.

5. The combination with a railway booster and the axle to be driven thereby, of connecting means including a clutch member moving with the axle, a shiftable clutch member, and a booster operated driving member cooperating with said shiftable clutch member to throw the latter into and out of engagement with the first mentioned clutch member, according to the relative speeds of locomotive and booster.

6. The combination with a railway booster, the axle to be driven thereby, and a booster casing, of connecting means including a clutch member on the axle, a cooperating clutch member shiftable along the axle into and out of engagement therewith, friction means on said shiftable clutch member slidably engaged with the casing, so as to be free for movement along the shaft with the clutch member while affording resistance to its rotation, and a booster-operated driving member cooperating with said shiftable clutch member and its friction means aforesaid to throw the clutch.

7. The combination with a railway booster and the axle to be driven thereby, of connecting means including a clutch member moving with the axle, a shiftable clutch member, a booster-operated driving member in threaded connection with said shiftable clutch member to throw the latter into and out of engagement with the first-mentioned clutch member, and means for limiting retraction of said shiftable clutch member and preventing it from jamming.

8. The combination with a railway booster and the axle to be driven thereby, of connecting means including opposed clutch members on the axle, a clutch device on said axle between said members expansible into and out of driving engagement with them, and booster operated driving means cooperating with said clutch device to expand and collapse the same according to the relative speeds of locomotive and booster.

9. The combination with a railway booster and the axle to be driven thereby, of opposed clutch members on the axle, and a clutch device on said axle between said members expansible into and out of driving engagement with them, including clutch members and a booster-operated driving and expanding member.

10. The combination with a railway booster and the axle to be driven thereby, of opposed clutch members on the axle; a clutch device on said axle between said members expansible into and out of driving engagement with them, including clutch members and a booster-operated driving and expanding member in oppositely threaded engagement with them; and means for causing the expansible clutch members to move in unison and preventing them from jamming on said expanding member when retracted.

11. The combination with a railway booster and its shaft and the axle to be driven by it, of connecting means between them including cooperating gears on said axle and on the booster shaft, one of said gears being shiftable for rotation about an axis eccentrically displaced with respect to the axis of rotation of the shaft upon which said gear is mounted.

12. The combination with a railway booster and its shaft and the axle to be driven by it, of connecting means including cooperating gears on axle and shaft revolving concentric with their respective shafts when in mesh, one of said gears being shiftable to revolve eccentric to the shaft on which it is mounted, out of mesh with the other.

13. The combination with a railway booster and its shaft and the axle to be driven by it, of connecting means including a gear on said axle and a cooperating driving gear revolving concentric with the booster shaft when in mesh with said axle gear, but connected to said booster shaft by an Oldham coupling, so as to be shiftable to revolve out of mesh with the axle gear.

14. The combination with a railway booster and its shaft, the axle to be driven by it, and a booster casing with bearings for shaft and axle, of cooperating gears on axle and shaft, the latter shiftably mounted thereon, laterally shiftable bearings for the shaft gear between the shaft bearings and means for shifting said bearings and gear to allow revolution of the latter out of mesh with the axle gear.

15. The combination with a railway booster and its shaft, the axle to be driven by it, and a booster casing with bearings for shaft and axle, of cooperating gears on axle and shaft, the latter shiftably mounted thereon, a carriage with bearings for the shaft gear slidably mounted in the booster casing, and means for shifting said carriage and gear including a pressure cylinder mounted on the upper part of the booster casing.

16. The combination with a railway booster and its shaft, the axle to be driven by it, and a booster casing with bearings for shaft and axle, of cooperating gears on axle and shaft, the latter shiftably mounted thereon, a carriage with bearings for the shaft gear shiftable fore and aft in the booster casing, means for shifting said carriage and gear including a fluid pressure operated piston operatively connected thereto, and longitudinally extending ways for guiding said carriage during its shifting movement.

In testimony whereof, I have hereunto signed my name.

EINAR JOHAN BRING.